(12) United States Patent
Kang

(10) Patent No.: US 6,661,851 B1
(45) Date of Patent: Dec. 9, 2003

(54) BI-DIRECTIONAL VECTOR ROTATOR

(75) Inventor: Inyup Kang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 519 days.

(21) Appl. No.: 09/693,112

(22) Filed: Oct. 20, 2000

(51) Int. Cl.$^7$ .............................................. H04L 27/22
(52) U.S. Cl. ...................... 375/322; 375/344; 327/238; 327/254
(58) Field of Search ................................. 375/326, 327, 375/344, 355, 322; 455/192.1, 192.2; 237/237, 238, 284

(56) References Cited

U.S. PATENT DOCUMENTS

| | | | |
|---|---|---|---|
| 4,354,249 A | | 10/1982 | King et al. |
| 4,604,583 A | | 8/1986 | Aoyagi et al. |
| 5,579,346 A | * | 11/1996 | Kanzaki ..................... 375/344 |
| 5,796,783 A | | 8/1998 | Crawford |
| 5,832,043 A | * | 11/1998 | Eory ........................... 375/344 |
| 6,151,371 A | * | 11/2000 | Maruyama ................... 375/344 |
| 6,359,944 B1 | * | 3/2002 | Curtis et al. ................ 375/344 |

FOREIGN PATENT DOCUMENTS

EP          0705011        4/1996

* cited by examiner

Primary Examiner—Amanda T. Le
(74) Attorney, Agent, or Firm—Philip R. Wadsworth; Charles D. Brown; Kevin T. Cheatham

(57) ABSTRACT

A bi-directional vector rotator that can be used to provide outputs having phases that are rotated in clockwise and counter clockwise directions relative to that of the input signal. The bi-directional vector rotator includes a product term generator that receives a complex input and a complex carrier signal and generates product terms. Combiners then selectively combine the product terms to generate the outputs. By sharing the same product term generator for both clockwise and counter clockwise phase rotations, the bi-directional vector rotator can be implemented using less circuitry than that for a conventional design employing two uni-directional vector rotators. Moreover, only one complex carrier signal is needed by the bi-directional vector rotator instead of two for the conventional design. Further simplification in the design of the bi-directional vector rotator can be achieved by selecting the proper sampling rate for the complex input. The bi-directional vector rotator can be advantageously used in a receiver device, and is especially efficient in demodulating a multi-carrier signal having multiple (e.g., three) modulated signals.

14 Claims, 4 Drawing Sheets

BI-DIRECTIONAL VECTOR ROTATOR

BACKGROUND OF THE INVENTION

I. Field of the Invention

The present invention relates to data transmissions. More particularly, the present invention relates to a bi-directional vector rotator capable of rotating the phase of a signal in clockwise and counter clockwise directions.

II. Description of the Related Art

In a typical digital communications system, data is processed at a transmitter device, modulated using a particular modulation scheme, filtered, amplified, and transmitted to one or more receiver devices. The modulation scheme can be M-ary phase shift keying (e.g., BPSK, QPSK, OQPSK, and so on), M-ary quadrature amplitude modulation (i.e., M-QAM), or some other scheme. At a receiver device, the modulated signal is received, conditioned, demodulated, and processed to recover the transmitted data.

Depending on the particular modulation scheme used at the transmitter device, the demodulation typically includes converting the received modulated signal into inphase (I) and quadrature (Q) signals that are further processed. The quadrature downconversion can be performed using analog or digital circuitry. In a typical analog implementation, the modulated signal is multiplied with inphase and quadrature carrier signals to generate the inphase and quadrature signals, respectively. And in a typical digital implementation, the modulated signal is digitized at a high frequency and digitally multiplied with the inphase and quadrature carrier signals to generate inphase and quadrature samples.

For some receiver designs, a vector rotator is employed in conjunction with a carrier tracking loop to lock the phase of a complex carrier signal to that of the received modulated signal. The modulated signal is initially downconverted to near DC by an intermediate frequency (IF) carrier signal that is free running and not locked to the modulated signal. The vector rotator then performs a complex multiply of the downconverted signal with the complex carrier signal to generate a phase rotated output signal. The complex carrier signal is typically a lower frequency signal that is synthesized based on a clock signal. The phase of the complex carrier signal is adjusted by the carrier tracking loop and locked to that of the modulated signal (i.e., the phase of the output signal has 0° phase offset when the carrier tracking loop is locked). When the carrier tracking loop is not locked, phase rotation in the output signal is used to adjust the phase of the complex carrier signal such that the phase rotation is reduced and removed.

A conventional vector rotator typically performs phase rotation in one direction (i.e., clockwise or counter clockwise) and is able to translate a modulated signal in one direction (i.e., either down to a lower frequency or up to a higher frequency). For the receiver designs described above, the initial frequency downconversion typically places the modulated signal at a particular positive frequency such that the vector rotator can perform the frequency translation or quadrature downconversion (in one direction) from the positive frequency down to DC.

In certain applications, phase rotation in both directions is needed and a second vector rotator is provided. The additional vector rotator typically equates to additional hardware, which increases the complexity and costs of the device. Moreover, the carrier signal generator typically needs to be modified to provide a second phase for the second vector rotator, thereby further increasing the complexity of the design.

Thus, a bi-directional vector rotator capable of performing phase rotation in both clockwise and counter clockwise directions is advantageous for some applications and is highly desirable.

SUMMARY OF THE INVENTION

The present invention provides a bi-directional vector rotator that can be used to generate outputs having phases that are rotated in clockwise and counter clockwise directions relative to that of the input signal. The bi-directional vector rotator includes a product term generator that receives a complex input and a complex carrier signal and generates product terms. Combiners then selectively combine the product terms to generate the outputs. By sharing the same product term generator for both clockwise and counter clockwise phase rotations, the bi-directional vector rotator can be implemented using less circuitry than that for a conventional design employing two uni-directional vector rotators. Moreover, only one complex carrier signal is needed by the bi-directional vector rotator instead of two for the conventional design. Further simplification in the design of the bi-directional vector rotator can be achieved by selecting the proper sampling rate for the complex input, as described below. The bi-directional vector rotator can be advantageously used in a receiver device, and is especially efficient in demodulating a multi-carrier signal having multiple (e.g., three) modulated signals.

An embodiment of the invention provides a bi-directional vector rotator that includes a product term generator coupled to first and second sets of combiners. The product term generator receives and multiplies a complex input with a complex carrier signal to generate a set of product terms. Each product term is representative of a particular combination of a real or imaginary component of the complex input and a real or imaginary component of the complex carrier signal. The first set of combiners selectively combines the product terms to generate a first complex output having a phase that is rotated in a first direction (e.g., clockwise) relative to that of the complex input. The second set of combiners selectively combines the product terms to generate a second complex output having a phase that is rotated in a second direction (e.g., counter clockwise) relative to that of the complex input.

The product term generator can be implemented in various manners. For example, the product term generator can be implemented with a set of multipliers, with each multiplier multiplying the real or imaginary component of the complex input with the real or imaginary component of the complex carrier signal to provide a respective product term. The product term generator can also be implemented with one or more look-up tables, combinatory logic, and others (e.g., hardware, software, or a combination thereof).

In a specific design, the complex input comprises digitized inphase and quadrature samples, $I_{IN}$ and $Q_{IN}$, the complex carrier signal comprises inphase and quadrature carrier signals, $\cos(\theta)$ and $\sin(\theta)$, and the product terms comprises $I_{IN}\cos\theta$, $Q_{IN}\sin\theta$, $Q_{IN}\cos\theta$, and $I_{IN}\sin\theta$. The first set of combiners adds the product terms $I_{IN}\cos\theta$ and $Q_{IN}\sin\theta$ to generate inphase samples, $I_{ROT}^{cw}$, and subtracts the product term $I_{IN}\sin\theta$ from the product term $Q_{IN}\cos\theta$ to generate quadrature samples, $Q_{ROT}^{cw}$. Similarly, the second set of combiners subtracts the product term $Q_{IN}\sin\theta$ from the product term $I_{IN}\cos\theta$ to generate inphase samples, $I_{ROT}{}^{ccw}$, and adds the product terms $I_{IN} \sin \theta$ and $Q_{IN} \cos \theta$ to generate quadrature samples, $Q_{ROT}{}^{ccw}$. The resolution of the first and second complex outputs can be maintained similar to that of the complex input (e.g., 4 bits, or some other resolution).

Another embodiment of the invention provides a method for generating signals having phases that are rotated in clockwise and counter clockwise directions. In accordance with the method, a complex input and a complex carrier signal, each having real and imaginary components, are received and used to generate a set of product terms. Each product term is representative of a particular combination of a real or imaginary component of the complex input with a real or imaginary component of the complex carrier signal. The product terms are then selectively combined to generate a first complex output having a phase that is rotated in the clockwise direction relative to that of the complex input. The product terms are further selectively combined to generate a second complex output having a phase that is rotated in the counter clockwise direction relative to that of the complex input. The first and second complex outputs may be truncated or rounded to a resolution similar to that of the complex input. Again, the product terms can be generated by a set of multipliers, one or more look-up tables, combinatory logic, or others.

Another embodiment of the invention provides a receiver for use in a wireless communications system. The receiver includes a front-end unit coupled to a bi-directional vector rotator. The front-end unit receives, conditions, and digitizes a received signal to provide a complex input signal. The bi-directional vector rotator multiplies the complex input signal with a first complex carrier signal to provide first and second complex outputs. The first complex output has a phase that is rotated in a first direction (e.g., clockwise) relative to that of the complex input signal, and the second complex output has a phase that is rotated in a second direction (e.g., counter clockwise) relative to that of the complex input signal.

In a specific application, the received signal is a multi-carrier signal conforming to a CDMA-2000 standard (identified below) and including three modulated signals centered at first, second, and third frequencies. The first complex output then corresponds to the modulated signal centered at the first frequency, and the second complex output corresponds to the modulated signal centered at the third frequency. For ease of implementing the bi-directional vector rotator, if the first, second, and third frequencies are separate by a particular sub-carrier frequency, $f_{sc}$, the complex input signal can comprise complex samples having a sample rate, $f_s$, that is a multiple of four times the sub-carrier frequency (i.e., $f_s=4f_{sc}$, $8f_{sc}$, and so on).

The receiver typically further includes a first tracking loop coupled to a numerically controlled oscillator (NCO), and a second tracking loop coupled to a voltage controlled oscillator (VCO). The first tracking loop receives the first or second complex output, or both, and provides a first control signal. The NCO receives the first control signal and generates the first complex carrier signal in response. The second tracking loop receives the complex input signal and provides a second control signal. The VCO receives the second control signal and generates a second complex carrier signal that is then used by the front-end unit (e.g., for quadrature downconversion) to provide the complex input signal.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
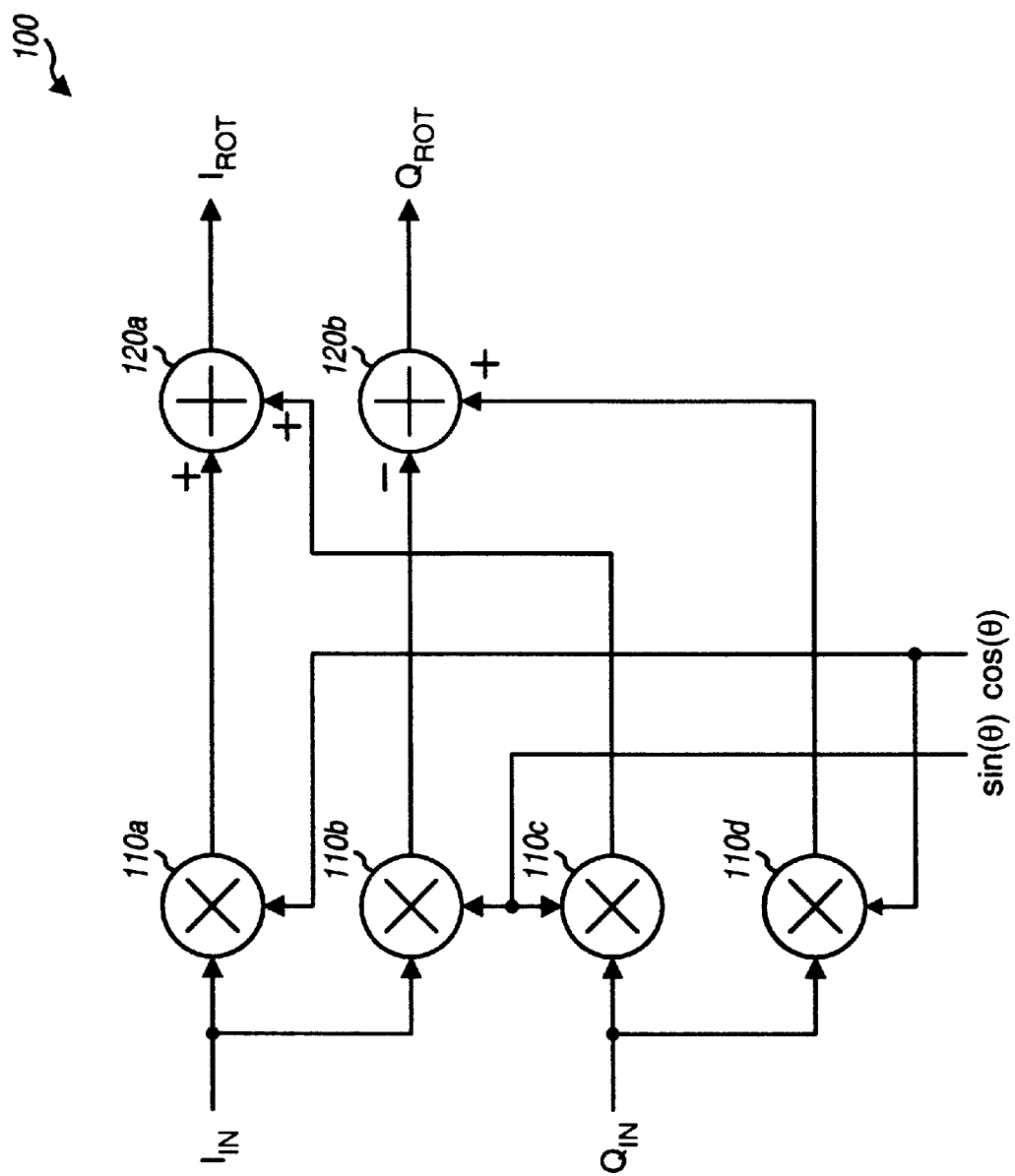
FIG. 1 is a block diagram of a conventional vector rotator that can be used to rotate the phase of the inphase ($I_{IN}$) and quadrature ($Q_{IN}$) samples in one direction.

FIG. 1 is a block diagram of a conventional vector rotator 100 that can be used to rotate the phase of the complex input samples in one direction. The complex input samples comprise the inphase ($I_{IN}$) and quadrature ($Q_{IN}$) samples, and each pair of $I_{IN}$ and $Q_{IN}$ samples can be viewed as a complex vector represented as $I_{IN}+jQ_{IN}$. Phase rotation in the clockwise direction by an angle $\theta$ is mathematically equivalent to multiplication of the complex vector by the term $e^{-j\theta}$. The phase rotated vector, $I_{ROT}{}^{cw}+jQ_{ROT}{}^{cw}$, for the clockwise rotation can be expressed as:

$$I_{ROT}^{cw} + jQ_{ROT}^{cw} = (I_{IN} + jQ_{IN})e^{-j\theta} \qquad \text{Eq (1)}$$
$$= (I_{IN} + jQ_{IN})(\cos\theta - j\sin\theta)$$
$$= (I_{IN}\cos\theta + Q_{IN}\sin\theta) + j(Q_{IN}\cos\theta - I_{IN}\sin\theta),$$

where $I_{ROT}{}^{cw}=I_{IN} \cos \theta + Q_{IN} \sin \theta,$ and $Q_{ROT}{}^{cw}=Q_{IN} \cos \theta - I_{IN} \sin \theta,$ which is equivalent to $I_{ROT}{}^{cw}=I_{IN} \cos \theta + Q_{IN} \cos(90-\theta),$ and $$Q_{ROT}{}^{cw}=Q_{IN} \cos \theta - I_{IN} \cos(90-\theta). \qquad \text{Eq (2)}$$

Similarly, phase rotation in the counter clockwise direction by an angle $\theta$ is mathematically equivalent to multiplication of the complex vector by the term $e^{j\theta}$. The phase rotated vector, $I_{ROT}{}^{ccw}+jQ_{ROT}{}^{ccw}$, for the counter clockwise rotation can be expressed as:

$$I_{ROT}^{ccw} + jQ_{ROT}^{ccw} = (I_{IN} + jQ_{IN})e^{j\theta} \qquad \text{Eq (3)}$$
$$= (I_{IN} + jQ_{IN})(\cos\theta + j\sin\theta)$$
$$= (I_{IN}\cos\theta - Q_{IN}\sin\theta) + j(Q_{IN}\cos\theta + I_{IN}\sin\theta),$$

where $I_{ROT}{}^{ccw}=I_{IN} \cos \theta - Q_{IN} \cos(90-\theta),$ and $$Q_{ROT}^{ccw} = Q_{IN} \cos\theta + I_{IN} \cos(90-\theta).  \quad\quad\quad \text{Eq (4)}$$

It can be noted from equations (2) and (4) that the same cosine product terms are used to generate the phase rotated vectors, $I_{ROT}+jQ_{ROT}$, for both clockwise and counter clockwise rotations. The difference is that the second cosine product terms for $I_{ROT}^{ccw}$ and $Q_{ROT}^{ccw}$ for the counter clockwise rotation are inverted relative to the second cosine product terms for $I_{ROT}^{cw}$ and $Q_{ROT}^{cw}$ for the clockwise rotation.

FIG. 1 shows a configuration that performs clockwise phase rotation. The $I_{IN}$ samples are provided to multipliers 110a and 110b and the $Q_{IN}$ samples are provided to multipliers 110c and 110d. Multipliers 110a and 110d also receive the real component, $\cos(\theta)$, of a complex carrier signal, and multipliers 110b and 110c also receive the imaginary component, $\sin(\theta)$, of the complex carrier signal. Each multiplier 110 multiplies the respective input samples with the real or imaginary component and provides a respective product term. For clockwise phase rotation, the product terms from multipliers 110a and 110c are added together by an adder 120a to provide the phase rotated $I_{ROT}^{cw}$ samples, and the product term from multiplier 110b is subtracted from the product term from multiplier 110d by an adder 120b to provide the phase rotated $Q_{ROT}^{cw}$ samples. Multipliers 110a through 110d can be referred to as a product term generator, and adders 120a and 120b can be referred to as the output combiners.

Figure 2:
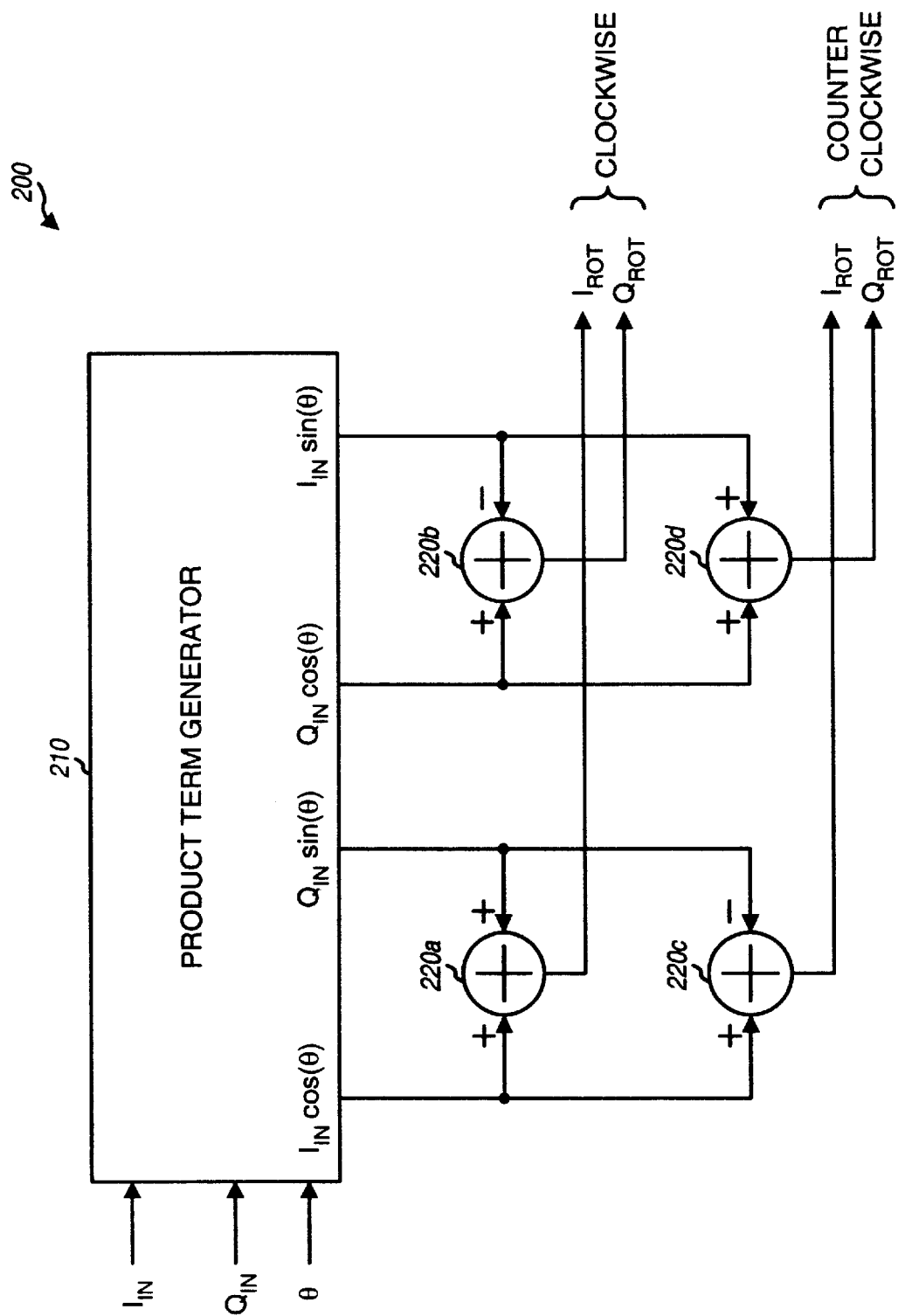
FIG. 2 is a block diagram of a bi-directional vector rotator of the invention that can be used to rotate the phase of the $I_{IN}$ and $Q_{IN}$ samples in both clockwise and counter clockwise directions.

FIG. 2 is a block diagram of a bi-directional vector rotator 200 that can be used to rotate the phase of the $I_{IN}$ and $Q_{IN}$ samples in both clockwise and counter clockwise directions. The $I_{IN}$ and $Q_{IN}$ samples and the phase rotation angle $\theta$ are provided to a product term generator 210 that generates the product terms, $I_{IN} \cos\theta$, $Q_{IN} \sin\theta$, $Q_{IN} \cos\theta$, and $I_{IN} \sin\theta$. The real and imaginary components, $\cos(\theta)$ and $\sin(\theta)$, of the carrier signal can be generated within product term generator 210 based on the phase value $\theta$. Alternatively, the $\cos(\theta)$ and $\sin(\theta)$ components can be provided by another unit external to product term generator 210.

The product terms $I_{IN} \cos\theta$ and $Q_{IN} \sin\theta$ are provided to adders 220a and 220c, and the product terms $Q_{IN} \cos\theta$ and $I_{IN} \sin\theta$ are provided to adders 220b and 220d. For clockwise phase rotation, adder 220a adds the terms $I_{IN} \cos\theta$ and $Q_{IN} \sin\theta$ to generate the $I_{ROT}^{cw}$ samples, and adder 220b subtracts the term $I_{IN} \sin\theta$ from the term $Q_{IN} \cos\theta$ to generate the $Q_{ROT}^{cw}$ samples. Similarly, for counter clockwise phase rotation, adder 220c subtracts the term $Q_{IN} \sin\theta$ from the term $I_{IN} \cos\theta$ to generate the $I_{ROT}^{ccw}$ samples, and adder 220d adds the terms $Q_{IN} \cos\theta$ and $I_{IN} \sin\theta$ to generate the $Q_{ROT}^{ccw}$ samples.

Product term generator 210 can be implemented in various manners. For a digital implementation, product term generator 210 can be implemented, for example, using four digital multipliers (such as that shown in FIG. 1), one or more look-up tables (LUTs), combinatory logic, or other circuit. For an analog implementation, product term generator 210 can be implemented, for example, using Gilbert cell multipliers, field-effect transistors (FETs), and other circuits. Product term generator 210 can also be implemented using micro-code or software executed on a processor. Adders 220 can also be implemented using hardware, software, or a combination thereof in a manner known in the art.

Bi-directional vector rotator 200 can be designed to provide outputs having a particular resolution. The phase rotated samples can be designed to have the same resolution as that of the input samples so that the complexity of the subsequent processing blocks is not increased by the use of the bi-directional vector rotator. The product term generator can be designed to operate on, and provide intermediate results (e.g., the product terms) having higher resolution. The subsequent adders can then be designed to add or subtract the product terms, and to either round or truncate the results to the desired resolution.

The bi-directional vector rotator can be used in many applications. One such application is for the demodulation of a modulated signal in a code division multiple access (CDMA) communications system. The use of CDMA techniques in a multiple access communications system is known in the art.

CDMA systems are typically designed to conform to one or more standards such as the "TIA/EIA/IS-95-A Mobile Station-Base Station Compatibility Standard for Dual-Mode Wideband Spread Spectrum Cellular System" (hereinafter referred to as the IS-95-A standard), the "TIA/EIA/IS-98 Recommended Minimum Standard for Dual-Mode Wideband Spread Spectrum Cellular Mobile Station" (hereinafter referred to as the IS-98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (hereinafter referred to as the W-CDMA standard), and the "TR-45 Physical Layer Standard for CDMA 2000 Spread Spectrum Systems," (hereinafter referred to as the CDMA-2000 standard). New CDMA standards are continually proposed and adopted for use.

Figure 3:
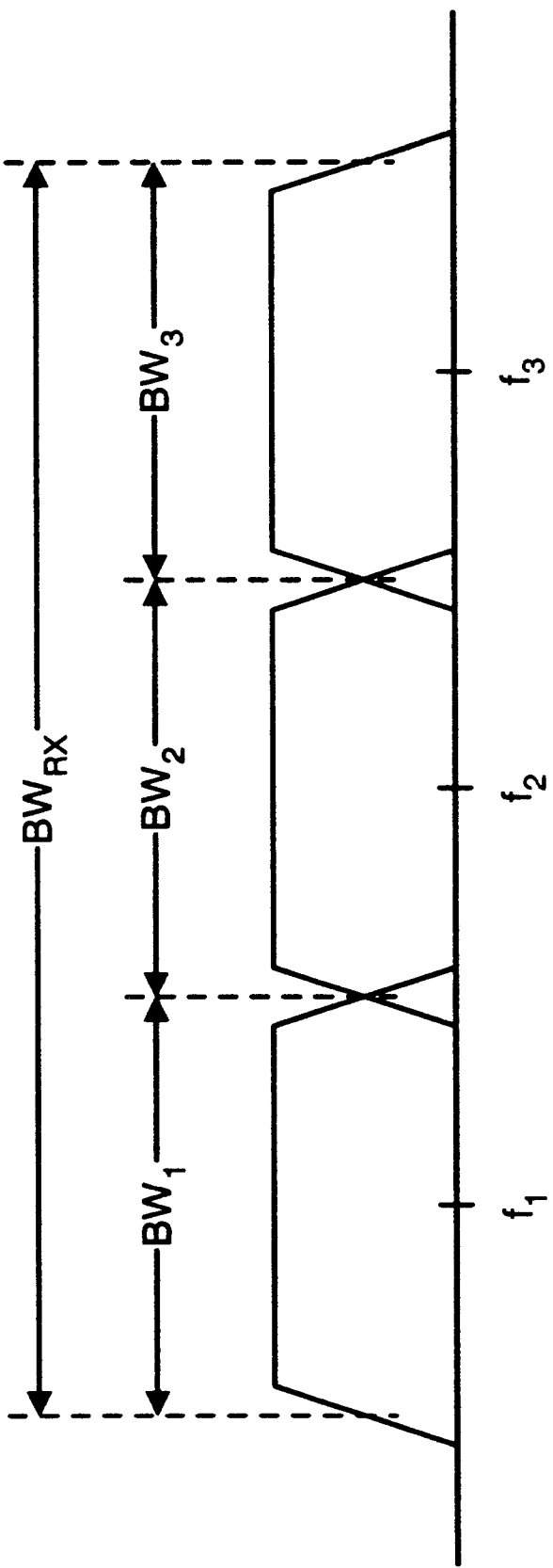
FIG. 3 is a diagram of a multi-carrier (MC) signal supported by the CDMA-2000 standard to provide up to three times the data transmission capability of an IS-95 CDMA signal.

FIG. 3 is a diagram of a multi-carrier (MC) signal supported by the CDMA-2000 standard to provide up to three times the data transmission capability of an IS-95 CDMA signal. The multi-carrier signal includes three modulated signals centered at frequencies of $f_1$, $f_2$, and $f_3$ and occupying bandwidths of $BW_1$, $BW_2$, and $BW_3$, respectively. The multi-carrier signal occupies a total bandwidth of $BW_{RX}$. In accordance with the CDMA-2000 standard, each modulated signal is generated with its own carrier signal, and the modulated signal is thus also referred to as a "sub-carrier" of the multi-carrier signal. The data in the three modulated signals can be from multiple transmission sources or from a single source. Three modulated signals may be used, for example, to increase the data transmission capacity of a communications system.

The multi-carrier signal shown in FIG. 3 can correspond to a transmitted signal in a multi-carrier mode defined by the CDMA-2000 standard. In this mode, each modulated signal corresponds to an IS-95 CDMA spread spectrum signal having a bandwidth of approximately 1.23 MHz. For ease of implementation, the CDMA signals can be equally spaced in frequency (i.e., $\Delta f = f_3 - f_2 = f_2 - f_1$). For efficient utilization of the available signal spectrum, the modulated signals can be spaced by approximately the signal bandwidth (i.e., $\Delta f \approx BW$), where BW is the bandwidth of one modulated signal (e.g., $BW \equiv 1.23$ MHz for the IS-95 CDMA signal).

Figure 4:
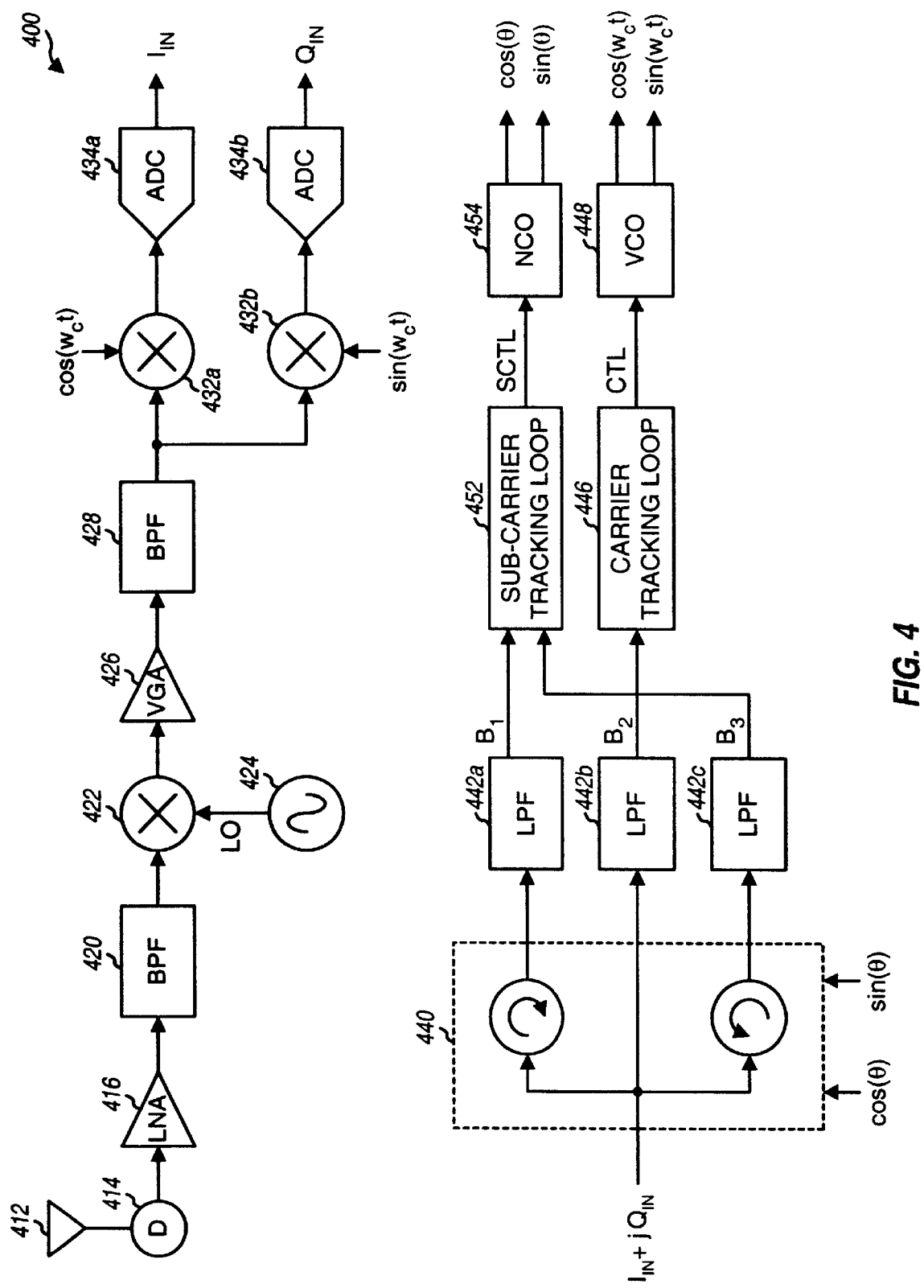
FIG. 4 is a block diagram of an embodiment of a receiver suitable for processing the multi-carrier signal shown in FIG. 3.

FIG. 4 is a block diagram of an embodiment of a receiver 400 suitable for processing the multi-carrier signal shown in FIG. 3. The transmitted signal is received by an antenna 412, routed through a duplexer 414, and amplified by a low noise amplifier (LNA) 416. The amplified signal is then filtered by a bandpass filter (BPF) 420 to remove noise and spurious signals that can cause intermodulation products in the subsequent signal processing stages.

The filtered signal is provided to a mixer 422 and downconverted from radio frequency (RF) to intermediate frequency (IF) with a carrier signal from a local oscillator (LO)

424. The IF signal from mixer 422 is then amplified by a variable gain amplifier (VGA) 426 to provide a signal having the desired signal level. The amplified signal from VGA 426 is further filtered by a bandpass filter (BPF) 428 to remove out-of-band noise prior to sampling. The filtered signal from bandpass filter 428 is provided to mixers 432a and 432b and quadrature downconverted with the inphase signal, $\cos(\omega_c t)$, and the quadrature signal, $\sin(\omega_c t)$, respectively, to generate inphase (I) and quadrature (Q) baseband signals. The I and Q signals are then provided to analog-to-digital converters (ADCs) 434a and 434b, respectively, and digitized to generate the inphase ($I_{IN}$) and quadrature ($Q_{IN}$) samples.

In the embodiment shown in FIG. 4, bandpass filter 428 provides anti-alias filtering such that out-of-band noise and spurious signals do not fold inband as a result of sampling by ADCs 434. Bandpass filter 428 thus has a bandwidth related to the bandwidth of the signal being processed. For the multi-carrier signal shown in FIG. 3, bandpass filter 428 can be designed with a bandwidth matched to the bandwidth of the multi-carrier signal (i.e., $BW_{RX}$). However, a filter having a narrower or wider bandwidth may also be used. The anti-aliasing filtering can also be performed by a pair of lowpass filters located between mixers 432 and ADCs 434. The elements from duplexer 414 to ADCs 434 may be referred to as the front-end unit of the receiver device.

In the receiver design shown in FIG. 4, the quadrature downconversion is performed with analog circuitry by mixers 432a and 432b. In other receiver designs, the quadrature downconversion can also be performed digitally by sampling the modulated signal at a high sampling rate.

FIG. 4 shows a specific receiver design, and other designs are also possible and are within the scope of the invention. In typical receiver designs, multiple stages of frequency downconversion, filtering, and amplification may be provided. The frequency downconversion, filtering, and amplification can be distributed in various configurations throughout the received signal path.

Referring to FIG. 3, for ease of implementation, the modulated signals centered at $f_1$ and $f_3$ are typically generated based on a single sub-carrier signal having a frequency of ($f_{sc}=f_3-f_2=f_2-f_1$). When this is the case, the demodulation of these modulated signals can also be achieved based on a single sub-carrier signal having the same frequency $f_{sc}$.

After the quadrature downconversion by mixers 432 and sampling by ADCs 434, the complex samples can be represented as:

$$I_{IN}(n)+jQ_{IN}(n)=B_1(n)e^{j\omega_{sc}nT_s}+B_2(n)+B_3(n)e^{-j\omega_{sc}nT_s}, \quad \text{Eq (5)}$$

where $T_s$ is the sampling period and $\omega_{sc}=2\pi f_{sc}$.

When $B_1(n)$ and $B_3(n)$ are offset by the same phase, as shown in equation (5), a bi-directional vector rotator can be used to recover both modulated signals. Referring to FIG. 4, the complex samples, $I_{IN}+jQ_{IN}$, from ADCs 434 are provided to a bi-directional vector rotator 440 that generates output samples corresponding to each of the three modulated signals in the multi-carrier signal. The modulated signal centered at the frequency $f_2$ is quadrature downconverted to DC by mixers 432 (i.e., the carrier signals $\cos(\omega_c t)$ and $\sin(\omega_c t)$ are locked to the modulated signal centered at the frequency $f_2$). The modulated signal centered at the frequency $f_3$ can then be downconverted to DC by performing a counter clockwise phase rotation of the complex samples, $I_{IN}+jQ_{IN}$, and the modulated signal centered at the frequency $f_1$ can be upconverted to DC by performing a clockwise phase rotation of the complex samples, $I_{IN}+jQ_{IN}$.

To recover the modulated signal centered at the frequency $f_2$, the complex samples, $I_{IN}+jQ_{IN}$, are simply filtered by a lowpass filter 442b having a bandwidth matched to that of the modulated signal being recovered (i.e., $BW_2$). To recover the modulated signal centered at the frequency $f_1$, the complex samples, $I_{IN}+jQ_{IN}$, are frequency converted from ($f_1-f_2$) to DC by bi-directional vector rotator 440 and filtered by a lowpass filter 442a having a bandwidth, $BW_1$, matched to that of the modulated signal being recovered. And to recover the modulated signal centered at the frequency $f_3$, the complex samples, $I_{IN}+jQ_{IN}$, are frequency converted from ($f_3-f_2$) to DC by bi-directional vector rotator 440 and filtered by a lowpass filter 442c having a bandwidth, $BW_3$, matched to that of the modulated signal being recovered.

Bi-directional vector rotator 440 can be implemented with bi-directional vector rotator 200 shown in FIG. 2. The complex samples, $I_{IN}+jQ_{IN}$, are multiplied with the real and imaginary components, $\cos(\omega_{sc}nT_s)$ and $\sin(\omega_{sc}nT_s)$, of the complex sub-carrier signal to generate four product terms that are combined in the manner described above to generate two sequences of output samples corresponding to the clockwise and counter clockwise phase rotations.

Several phase lock loops are typically used to generate carrier signals having the proper phase and frequency for the quadrature downconversion and the phase rotations. In a typical design, a carrier tracking loop is used to track the phase and frequency of the modulated signal centered at $f_2$ and to downconvert the multi-carrier signal centered at the frequency $f_2$ down to DC. A sub-carrier tracking loop is then used to track the phase and frequency of the modulated signals centered at frequencies $f_1$ and $f_3$ and to downconvert these modulated signals down to DC.

The filtered samples, $B_2$, corresponding to the modulated signal centered at the frequency $f_2$ are provided to a carrier tracking loop 446 and processed to generate a control signal CTL. The control signal CTL is used to adjust the phase and frequency of a voltage controlled oscillator (VCO) 448 such that the carrier signal from VCO 448 is locked in phase and frequency to the modulated signal centered at the frequency $f_2$. VCO 448 provides the real and imaginary components, $\cos(\omega_c t)$ and $\sin(\omega_c t)$, of the complex carrier signal provided to mixers 432.

Similarly, the filtered samples, $B_1$ or $B_3$, corresponding to the modulated signal centered at the frequency $f_1$ or $f_3$, or both, are provided to a sub-carrier tracking loop 452 and processed to generate a control signal SCTL. The control signal SCTL is used to adjust the phase and frequency of a numerically controlled oscillator (NCO) 454 such that the complex subcarrier signal from NCO 454 is locked in phase and frequency to the modulated signal centered at the frequency $f_1$ or $f_3$. NCO 454 provides the real and imaginary components, $\cos(\theta)$ and $\sin(\theta)$, of the complex subcarrier signal having the proper phase at each sampling period, $nT_s$ (i.e., $\theta=\omega_{sc}nT_s$).

The samples corresponding to each of the modulated signals, $B_1(n)$, $B_2(n)$, and $B_3(n)$, are further processed by subsequent signal processing blocks (not shown in FIG. 4 for simplicity) that perform despreading, decovering, descrambling, decoding, and so on, in a manner known in the art. For example, the signal processing for the IS-95 CDMA signal is described in the aforementioned U.S. Pat. No. 5,103,459.

The implementation of bi-directional vector rotator 440 can be simplified greatly by proper selection of the ADC sampling frequency, $f_s$, relative to the sub-carrier frequency, $f_{sc}$. For example, if the sampling frequency, $f_s$, is selected to be multiples of four times the sub-carrier frequency, $f_{sc}$ (i.e., $f_s=4f_{sc}$, or $8f_{sc}$, or $4Nf_{sc}$, where N=1, 2, . . . ) the multiplication to generate the product terms can be simplified. When the condition $f_s=4Nf_{sc}$ is satisfied, the $\cos(\theta)$ and $\sin(\theta)$ each takes on values of $\{+1, 0, \text{ and } -1\}$ and the product terms can be generated by passing through or inverting the input samples, or by setting the output samples to zero.

In some system deployments, the sub-carrier frequency $f_{sc}$ is not equal to the chip rate (e.g., $f_{sc}=1.2288$ MHz and $f_{chip}=1.25$ MHz). For these systems, the sampling rate $f_s$ can be selected to be an integer (e.g., 1, 2, 3, and so on) times the chip rate to simplify the baseband processing of the samples. Alternatively, the sampling rate can still be selected as $4Nf_{sc}$ to simplify the vector rotation, and sample rate conversion can be performed thereafter to obtain samples at an integer times the chip rate.

The bi-directional vector rotator provides several advantages. First, only one product term generator is needed for phase rotation in both clockwise and counter clockwise directions. To generate phase rotation in both directions using two conventional uni-directional vector rotators would require two product term generators, which would double the required circuitry and increase complexity and costs. Second, the bi-directional vector rotator only requires one phase value $\theta$, or one set of $\cos(\theta)$ and $\sin(\theta)$, to generate product terms for both directions. Using two conventional uni-directional vector rotators, two phase values $\theta$ and $-\theta$ or two sets of $\cos(\pm\theta)$ and $\sin(\pm\theta)$ are needed, one for each product term generator. The carrier signal generator for the conventional design would then need to be modified to generate the required $\cos(\pm\theta)$ and $\sin(\pm\theta)$, which would further increase complexity and cost.

The bi-directional phase rotation can be performed at any point along the receive signal path. Referring to FIG. 4, the receive signal path includes the elements from antenna 412 through lowpass filters 442. Bi-directional phase rotation can be used for quadrature downconversion (e.g., shown being performed by mixers 432 in FIG. 4) and can also be used for frequency conversion of the upper and lower modulated signals in a multi-carrier signal (e.g., shown being performed by bi-directional vector rotator 440 in FIG. 4).

The bi-directional vector rotator can be implemented in various manners, as described above. For a digital implementation, the phase rotator can be implemented within a digital signal processor (DSP), an ASIC, a processor, a controller, one or more look-up tables, combinatory logic, or some other circuit elements, or a combination thereof. The bi-directional vector rotator can also be implemented in software or firmware executed on a processor.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A bi-directional vector rotator comprising:
   a product term generator operative to receive and multiply a complex input and a complex carrier signal to generate a set of product terms, wherein each product term is representative of a particular combination of a real or imaginary component of the complex input with a real or imaginary component of the complex carrier signal;
   a first set of combiners coupled to the product term generator and operative to selectively combine the product terms to generate a first complex output having a phase that is rotated in a first direction relative to that of the complex input; and
   a second set of combiners coupled to the product term generator and operative to selectively combine the product terms to generate a second complex output having a phase that is rotated in a second direction relative to that of the complex input.

2. The vector rotator of claim 1, wherein the product term generator includes
   a set of multipliers, each multiplier operative to receive and multiply the real or imaginary component of the complex input and the real or imaginary component of the complex carrier signal to provide a respective product term.

3. The vector rotator of claim 1, wherein the product term generator includes
   one or more look-up tables operative to receive the complex input and the complex carrier signal and provide the product terms.

4. The vector rotator of claim 1, wherein the product term generator includes
   combinatory logic operative to receive the complex input and the complex carrier signal and provide the product terms.

5. The vector rotator of claim 1, wherein
   the complex input comprises digitized inphase and quadrature samples, $I_{IN}$ and $Q_{IN}$, respectively,
   the complex carrier signal comprises inphase and quadrature carrier signals, $\cos(\theta)$ and $\sin(\theta)$, respectively, and
   the product terms comprises $I_{IN} \cos\theta$, $Q_{IN} \sin\theta$, $Q_{IN} \cos\theta$, and $I_{IN} \sin\theta$.

6. The vector rotator of claim 5, wherein the first set of combiners includes
   a first adder operative to receive and add the product terms $I_{IN} \cos\theta$ and $Q_{IN} \sin\theta$ to generate inphase samples having a phase that is rotated in the first direction relative to that of the complex input, and
   a second adder operative to receive and subtract the product term $I_{IN} \sin\theta$ from the product term $Q_{IN} \cos\theta$ to generate quadrature samples having a phase that is rotated in the first direction relative to that of the complex input.

7. The vector rotator of claim 6, wherein the second set of combiners includes
   a third adder operative to receive and subtract the product term $Q_{IN} \sin\theta$ from the product term $I_{IN} \cos\theta$ to generate inphase samples having a phase that is rotated in the second direction relative to that of the complex input, and
   a fourth adder operative to receive and add the product terms $I_{IN} \sin\theta$ and $Q_{IN} \cos\theta$ to generate quadrature samples having a phase that is rotated in the second direction relative to that of the complex input.

8. The vector rotator of claim 1, wherein the complex input and the first and second complex outputs each comprises digitized samples, and wherein resolution of each of the first and second complex outputs is similar to that of the complex input.

9. A method for generating phase rotated signals in clockwise and counter clockwise directions, the method comprising:
   receiving a complex input having real and imaginary components;
   receiving a complex carrier signal having real and imaginary components;

generating a set of product terms based on the complex input and the complex carrier signal, wherein each product term is representative of a particular combination of a real or imaginary component of the complex input with a real or imaginary component of the complex carrier signal;

selectively combining the product terms to generate a first complex output having a phase that is rotated in the clockwise direction relative to that of the complex input; and selectively combining the product terms to generate a second complex output having a phase that is rotated in the counter clockwise direction relative to that of the complex input.

10. The method of claim 9, further comprising:

truncating or rounding each of the first and second complex outputs to a resolution similar to that of the complex input.

11. The method of claim 9, wherein the product terms are generated by a set of multipliers, one or more look-up tables, or combinatory logic.

12. A receiver comprising:

a front-end unit operative to receive, condition, and digitize a received signal to provide a complex input signal; and a bi-directional vector rotator coupled to the front-end unit and operative to multiply the complex input signal with a first complex carrier signal to provide first and second complex outputs, wherein the first complex output has a phase that is rotated in a first direction relative to that of the complex input signal, and wherein the second complex output has a phase that is rotated in a second direction relative to that of the complex input signal, wherein the received signal includes three modulated signals centered at first, second, and third frequencies, and wherein the first complex output corresponds to the modulated signal centered at the first frequency and the second complex output corresponds to the modulated signal centered at the third frequency.

13. A receiver comprising:

a front-end unit operative to receive, condition, and digitize a received signal to provide a complex input signal; and a bi-directional vector rotator coupled to the front-end unit and operative to multiply the complex input signal with a first complex carrier signal to provide first and second complex outputs, wherein the first complex output has a phase that is rotated in a first direction relative to that of the complex input signal, and wherein the second complex output has a phase that is rotated in a second direction relative to that of the complex input signal, wherein the received signal includes three modulated signals centered at first, second, and third frequencies, and wherein the first complex output corresponds to the modulated signal centered at the first frequency and the second complex output corresponds to the modulated signal centered at the third frequency, wherein the first, second, and third frequencies are separate by a particular sub-carrier frequency, $f_{sc}$, and wherein the complex input signal comprises complex samples having a sample rate, $f_s$, that is a multiple of four times the sub-carrier frequency.

14. A receiver comprising:

a front-end unit operative to receive, condition, and digitize a received signal to provide a complex input signal; and a bi-directional vector rotator coupled to the front-end unit and operative to multiply the complex input signal with a first complex carrier signal to provide first and second complex outputs wherein the first complex output has a phase that is rotated in a first direction relative to that of the complex input signal, and wherein the second complex output has a phase that is rotated in a second direction relative to that of the complex input signal, wherein the received signal includes three modulated signals centered at first, second, and third frequencies, and wherein the first complex output corresponds to the modulated signal centered at the first frequency and the second complex output corresponds to the modulated signal centered at the third frequency, wherein the three modulated signals conforms to a multi-carrier signal defined by CDMA-2000 standard.

* * * * *